April 26, 1955
D. L. MILLER
2,707,171
DISPOSAL OF WASTE
Filed July 26, 1950
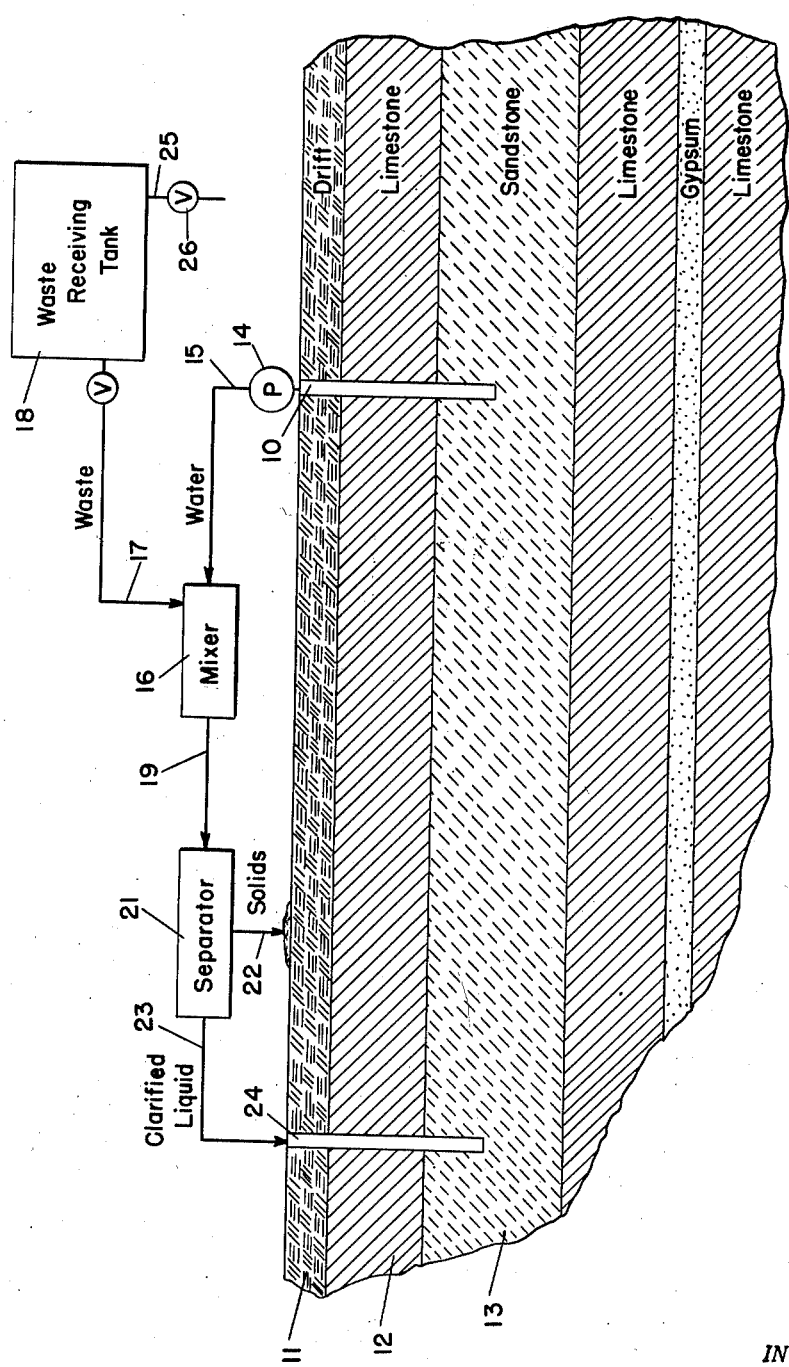
INVENTOR.
DWIGHT L. MILLER
BY Hugo A. Kennman
ATTORNEY United States Patent Office 2,707,171
Patented Apr. 26, 1955

2,707,171

DISPOSAL OF WASTE

Dwight L. Miller, Wyandotte, Mich., assignor to Sharples Chemicals Inc., a corporation of Delaware Application July 26, 1950, Serial No. 175,972

5 Claims. (Cl. 210—2)

This invention pertains generally to the disposal of wastes, and particularly to the disposal of industrial wastes into the ground.

Industrial wastes heretofore have been generally disposed of by dumping into streams, lakes, etc. However, many of these wastes not only are destructive to marine life, such as to fish, but also, in many instances, impart to the water undesirable odor and taste. This has resulted in objections so strong that in substantially all areas, commissions have been set up to regulate the types and quantities of industrial wastes which may be discarded into surface waters.

This has led to the suggestion, and in some instances the practice, of discarding industrial wastes into various porous underground strata. For example, it is more or less common practice in the petroleum industry to return to underground strata, salt water derived from such strata in the production of crude oil.

However, the disposal of other types of industrial wastes in this manner has given rise to the very difficult problem of maintaining the porosity of such strata. It will be seen that if the industrial wastes are of a character capable of chemical reaction in the stratum to form solid precipitates, the stratum will become plugged within a relatively short period of time, thus making it impossible to discard further wastes therein at the particular point. While such wastes might be discarded at other points in the same stratum, this would involve a very expensive procedure, since the stratum employed is at a considerable depth, and such plugging would require the drilling of new shafts or wells which is very expensive.

It has been proposed to chemically treat industrial wastes with various known chemicals to cause precipitation of solids therefrom, prior to the discharge of such wastes into underground strata. This would be followed by clarification to remove such solids, for example by filtration or decantation, whereupon the clarified liquid would be discharged into the strata. However, many industrial wastes contain such a variety of different chemical compounds, which in many instances are of unknown chemical structure, as to make it almost impossible to select with certainty the type of reagent or reagents with which to treat such wastes prior to their disposal, to make certain that all substances which might be precipitated would be removed therefrom.

Water-yielding underground strata usually are of such a porous nature as to be capable of receiving immense quantities of extraneous liquids, such as liquid industrial wastes. For example, a test made at Riverview, Michigan, with a well reaching down into the Sylvania stratum, and having a depth of approximately 300 feet, by pumping Detroit River water down into this well, showed that this well was capable of receiving 500 gallons per minute, while developing a back pressure of only 10 pounds per square inch gauge. This test was run continuously for 4 days with the back pressure leveling off at approximately 10 pounds per square inch gauge after the first 2 days.

To overcome the difficulties presented by possible plugging of water-yielding underground strata by the discharge of industrial wastes into the same, I have conceived the method of initially treating said wastes, prior to their discharge into such strata, with water derived from such strata to cause chemical reaction between such water and such wastes. This is followed by the separation of the solids formed by such chemical reaction by any means known in the art, such as by settling followed by decantation of the supernatant liquid, or by filtration, or by centrifuging, or otherwise. The liquid thus clarified is then discharged into the same stratum from which the water was obtained, or into any other water-yielding stratum in which the water has substantially the same chemical composition as the water with which the industrial waste has been treated.

My invention has at least two definite and distinct advantages. First, it will be seen that my chemical reagent is inexpensive in nature, and extremely abundant in supply. Second, it will be seen that the clarified liquid is discharged into substantially the same chemical environment which exists at the time of the treatment. It follows that substantially no further chemical reaction takes place in the stratum into which the clarified liquid is discharged.

The result is that there is no clogging of the stratum due to the disposal of wastes therein, and that a given shaft or well may be used almost indefinitely.

An additional advantage of my invention is that it may be practiced with the simplest of equipment, requiring merely the pumping of water from the particular stratum being used, the mixing of an appropriate amount of such water with the particular waste undergoing treatment to insure substantially complete chemical reaction therewith, the clarification of the treated waste, and the delivery of the clarified water, together with the clarifying water, into the same stratum from which the clarifying water was obtained, or into any other appropriate stratum. Such delivery may or may not require the application of pressure depending upon factors such as, the rate of flow of clarified waste mixture, and the natural porosity of the particular stratum being used, for in many instances the hydraulic head developed in a well or shaft by the delivery of the clarified waste material thereto is sufficient to cause a suitable flow of the clarified waste material into the stratum.

While this leaves for disposal the precipitates formed as a result of my process, it is found that the quantities thereof represent a very small percentage of the initial waste to be disposed of. These precipitates may be disposed of by any suitable means, such as by discharge onto a dump, or by burial, or by partial or total burning in the case of partially or completely combustible precipitates, etc. The amounts of such precipitates are held to a vertual minimum in the practice of my process, for in the case of the use of reagents from other sources, it is necessary to over-treat and obtain large quantities of precipitates, in order to insure against possible plugging of the strata.

The following examples which are by way of illustration, and not of limitation, exemplify the treatment of a large variety of industrial wastes by the application of my invention.

In the following table, reagent A was ground water obtained from the Sylvania stratum at Riverview, Michigan, by means of a well which is approximately 300 feet deep, and which leads down into this stratum. This ground water has a pH of approximately 7.4, and contains approximately 6.8 grams per liter of dissolved solids. The alkaline portion of these solids is equivalent to approximately 1.2 grams of sodium hydroxide, as found by titration in the presence of phenolphthalein indicator. This water also contains traces of hydrogen sulfide.

Reagent B was a solution which was compounded to closely approximate the chemical composition of ground water occurring at a depth of approximately 3400 feet in the so-called Prairie du Chien stratum at Riverview, Michigan. This ground water has a total soluble solids content of approximately 175 grams per liter. Its approximate equivalent in magnesium oxide is 6 grams per liter, in calcium oxide 30 grams per liter, in chlorine 108 grams per liter, in sulfur dioxide 0.27 gram per liter, in sulfur trioxide 0.12 gram per liter, and in bromine 0.11 gram per liter.

The amount of reagent used in each instance was approximately 20% by volume of the particular waste treated. The procedure was to mix the water and the waste at room temperature, and to let the mixture stand for a considerable period of time to permit settling of the precipitate formed as a result of the chemical reaction produced. This was followed by separation of the supernatant liquid from the precipitate by decantation. For test purposes, to determine whether a sufficient quantity of reagent had been used, the separated supernatant liquid was mixed with approximately 20% by volume of reagent water, and in each instance no further precipitation took place.

The table is as follows:

Table

| Type of Waste | Reagent | Type of Precipitate |
|---|---|---|
| Discharge liquids from amyl chloride vent scrubbers containing traces of amyl chloride, hydrogen chloride, dichloropentanes, and miscellaneous chemicals. | A | White Solid. |
| | B | Do. |
| Caustic water obtained from washing amyl chloride and containing traces of amyl chloride, caustic, and miscellaneous organic chemicals. | A | Dark precipitate, primarily magnesium hydroxide. |
| | B | Do. |
| Tank vent scrubber liquid containing small quantities of hydrogen chloride and organic chemicals. | A | None. |
| | B | Do. |
| Amyl alcohol caustic washings containing primarily amyl alcohol, caustic, and sodium chloride. | A | Heavy flocculent precipitate, containing primarily magnesium hydroxide. |
| | B | White precipitate containing primarily magnesium hydroxide. |
| Still discharge containing traces of amyl chloride, amyl alcohol, and other organic chemicals. | A | Brown to white precipitate, composition unknown. |
| | B | Do. |
| Amyl acetate still discharge containing traces of amyl acetate, amyl alcohol, acetic acid, and sulfuric acid. | A | Small amount of white precipitate, containing primarily magnesium hydroxide and magnesium sulfide. |
| | B | None. |
| Amylphenol vacuum jet discharge containing traces of phenol, amylphenol, amylene, and other organic materials. | A | Slight turbidity. |
| | B | Do. |
| Amylphenol acid waters | A | Heavy white precipitate-containing primarily magnesium hydroxide. |
| | B | Light white precipitate. |
| Still discharge containing traces of amyl mercaptan, amyl chloride, sodium hydrosulfide, hydrogen sulfide, ethanol, and sodium chloride. | A | Heavy black precipitate. |
| | B | Do. |
| Still discharge containing traces of amyl chloride, amylnaphthalene, caustic, and other chemicals. | A | Light brown precipitate. |
| | B | Do. |
| Ethylamines still discharge containing traces of ethylamines and tarry substances. | A | Light amber precipitate. |
| | B | Do. |
| Vacuum jet discharge containing alkylaminoethanols and related organic chemicals. | A | None. |
| | B | Do. |
| Still discharge containing traces of alkylphenol and related materials. | A | None. |
| | B | Light precipitate, composition unknown. |
| Mercaptan decanter liquid containing traces of isobutylene, tertiary dodecyl mercaptan, hydrogen sulfide, boron trifluoride, acids and related materials. | A | White to gray precipitate containing primarily calcium sulfide and magnesium hydroxide. |
| | B | Heavy white precipitate. |

The single figure of the drawings is a diagrammatic illustration in cross section of certain strata occurring to a depth of approximately 600 feet at Riverview, Michigan, as well as a diagrammatic illustration of a form of apparatus for the practice of my invention.

In the drawings at 10 is illustrated a well which extends down through surface drift, illustrated at 11, a limestone stratum illustrated at 12, into a sandstone stratum illustrated at 13. At 14 is shown a pump for pumping water from well 10. This water flows through line 15 into mixer 16, wherein the water is mixed with waste flowing into mixer 16 through line 17, from waste receiving tank 18. If desired, proportioning pumps (not shown) may be employed for proportioning the flow of water and waste to the mixer 16. From mixer 16, the mixture of water and waste flows through line 19 into separator 21. In separator 21 the solid phase is separated from the liquid phase, the solids being discharged through line 22 for disposal as desired. The liquid effluent from separator 21 flows through line 23, and is delivered to well 24 which as illustrated extends down into stratum 13.

Any other arrangement of apparatus may be employed for the intended purpose, that particularly described being merely for purposes of illustration.

The residence of the water and waste in mixer 16 in the apparatus illustrated is, of course, such as to permit substantially complete chemical reaction between the water and the waste. Mixer 16 may take any suitable form, and may be a continuous mixer, or a tank having stirring paddles, or otherwise. Mixer 16 and separator 21 may be combined into a single device, such as a tank having staggered baffles arranged in a manner so as to permit the settling of solids to the bottom of the tank, and their removal therefrom. Or any suitable commercial clarifier may be employed for both mixing and separating. Thus the reaction may be conducted continuously, semi-continuously, or batchwise, such as in a holding or mixing tank, or in any other suitable manner.

As pointed out above, the liquid effluent from the separating stage may be returned to the underground stratum under any desired pressure, generated by means of a pump, or otherwise, the hydraulic head developed in a well, such as illustrated in 24, for example, frequently in itself being suitable for the purpose.

The reaction between the water and the waste may be conducted at any desired temperature. Ordinary atmospheric temperature is suitable for the purpose. However, if desired the reaction may be conducted at an elevated temperature by the application of heat, or at a reduced temperature, or at the temperature resulting from the mixture of the water and the waste, the water usually being at a somewhat lower temperature than atmospheric, and the waste frequently being at a somewhat higher temperature, particularly if the latter comes from a process which is operated at elevated temperature. From a strictly scientific standpoint the reaction might be carried out at the temperature of the water in the stratum from which it is obtained, for this will be the temperature of the clarified waste mixture when it is returned to the same stratum. However, it is found that the temperature at which the reaction is conducted is not particularly critical with the ordinary industrial wastes. However, the temperaurte of the reaction is preferably not so high as to substantially convert the chemicals naturally occurring in the water into some other form, such as the conversion of calcium and/or magnesium bicarbonates into their carbonates, the latter in themselves being insoluble.

As pointed out above, any desired proportion of water to waste may be employed, the substantially minimum proportion of water to waste being that necessary to bring about complete reaction. Thus substantial excesses of water may be employed if desired for any reason.

As pointed out above, any water-yielding stratum may be employed. As illustrated in the drawing, a sandstone stratum is used, the particular stratum illustrated being the Sylvania stratum as it occurs at Riverview, Michigan. Limestone strata, if sufficiently porous to be water-yielding, can be employed as well as other water-yielding strata, such as shale when water-yielding.

A water-yielding stratum is, of course, a stratum which is sufficiently porous to yield water for pumping purposes. While strata capable of yielding water in relatively large quantities are preferred, it will be understood that any stratum capable of yielding water in pumpable quantities comes within the broad scope of the invention.

It will be understood that industrial wastes vary widely in composition, depending upon the waste of a particular process. It will also be understood that the chemical composition of various waters derived from various strata, and from various geographical areas, will vary widely. In fact, where a single stratum extends over many square miles there may be some difference in the chemical composition of the water derived therefrom at widely separated points. In view of this, it is preferred to return the clarified waste mixture to the stratum from which the water is derived at a point within a radius not greater than one mile, and more preferably within a radius of one-fourth mile. In fact, the clarified waste mixture might be returned to the same well from which the reaction water is obtained, particularly when the treatment and disposal of wastes is not carried on continuously, but with substantial time intervals elapsing between treatments.

Wastes may be treated individually or in admixture. The latter is sometimes preferred when the clarified waste mixtures are discarded into a stratum through a single well. This is particularly true when different wastes are capable of chemical reaction between themselves to form insoluble precipitates. This avoids chemical reaction of a character capable of possible plugging within a stratum. Thus different wastes may be collected in waste receiving tank 18, wherein any precipitate formed may be permitted to settle. Such precipitate may be removed by any suitable means, for example through line 25 controlled by valve 26.

Obviously, any other means for separating precipitate from the mixed wastes may be employed. Thus a pond containing the treating water can be employed to receive the different wastes, and the supernatant liquid may be withdrawn, such as by means of a weir. If the treating water is pumped continuously into the pond, flow over the weir may be continuous. The precipitate collects on the bottom of the pond. When the pond becomes so full of precipitate as to seriously interfere with the operation of the process, a new pond can be placed in use, and the old pond covered with earth, or the old pond may be cleaned out and placed back in use. In such an arrangement, the pond takes the place of receiving tank 18, mixer 16, and separator 21, as will be obvious.

It will be understood, of course, that my process may be combined with any other type of treatment, chemical or otherwise, and for any desired purpose. For example, the water or mixture of water and waste or clarified waste mixture may be treated, if desired, for sterilization purposes to prevent, for example, growth of bacteria or algae, either while on the surface or in the stratum or both.

From the above table, it will be seen that in certain instances, no perceivable precipitate is formed when a particular water is mixed with a particular waste. In such instances, my invention is of utility in insuring that no precipitate will be formed when the particular waste reaches the sub-surface stratum into which the waste is conducted. In such instances, my invention is also useful in taking care of any variation in the composition of the particular waste, such as would cause precipitation.

With respect to the ability of underground strata to absorb clarified waste mixtures, it has been geologically estimated that 200,000 gallons per day of clarified waste mixture can be pumped into the Sylvania stratum at Riverview, Michigan, and that 50 years hence, evidences of clarified waste will not be detected beyond the radius of one mile from the point at which such clarified waste mixtures are introduced into this stratum.

While my invention has been described in particular in connection with the disposal of industrial wastes, it is to be understood that it may be applied to the disposition of any other form of waste, such as municipal wastes, and particularly to sewage.

It is, of course, understood that the stratum selected for the practice of the invention will be so chosen in relation to strata from which potable water is obtained, that the diffusion of clarified waste in said first-mentioned stratum will not reach sources of potable water. In view of the slow diffusion pointed out above, and in view of the depths to which it is possible to sink wells or shafts, no difficulty is foreseen with respect to the selection of suitable strata for the practice of the invention.

For the purposes of the claims the term "well" is intended to include any form of shaft, well or other entrance into sub-surface strata. Thus, conceivably, abandoned mines might be employed, particularly when seepage into and out of contiguous strata is substantial.

It is to be understood that the above particular description is by way of illustration, and that many modifications both in the apparatus and process may be employed while realizing the advantages of this invention. Accordingly, it is intended that the patent shall cover, by suitable expression in the claims, whatever features of patentable novelty reside in the invention.

I claim:

1. A process for the disposal of a liquid waste which comprises mixing said waste with water derived from an underground water-yielding stratum, the proportion of water to waste being sufficiently high to permit any chemical reaction induced by the presence of said water to go to substantial completion, thereafter clarifying the liquid mixture of water and waste, and flowing the clarified liquid mixture thus obtained into a water-yielding underground stratum in which the water has approximately the same chemical composition as the water initially mixed with said waste.

2. The process of claim 1 in which the waste treated is an industrial waste, and in which the clarified liquid mixture is conducted into the same stratum from which the treating water was obtained, the point of introduction into said stratum of the clarified liquid mixture being spaced from the source of said treating water in said stratum.

3. The process of claim 2 in which the distance between the point at which the treating water is obtained in said stratum and the point at which the clarified liquid mixure is introduced into said stratum is not greater than one mile.

4. The process of claim 1 in which the clarified liquid mixture is delivered to the sub-surface stratum under applied pressure.

5. The process of claim 1 in which the temperature of the water-waste mixture is maintained throughout the process below a temperature at which solubles in the original treating water are converted to other chemical forms.

References Cited in the file of this patent

FOREIGN PATENTS

| 220,849 | Great Britain | Aug. 28, 1924 |
| 77,576 | Austria | of 1919 |

OTHER REFERENCES

The Oil and Gas Journal, Dec. 30, 1937, p. 198.
Grandone et al., R. I. 3719, pub. Aug. 1943 by U. S. Dept. of Interior, Bureau of Mines, p. 5.
Grandone, R. I. 3761, pub. July 1944 by U. S. Dept. of Interior, Bureau of Mines, pages 70 and 71.